Dec. 12, 1944.  D. G. SMELLIE  2,364,877
SUCTION CLEANER
Filed Nov. 11, 1943  2 Sheets-Sheet 1

INVENTOR.
Donald G. Smellie
BY
Harry S. Duvarss
ATTORNEY.

Dec. 12, 1944.  D. G. SMELLIE  2,364,877
SUCTION CLEANER
Filed Nov. 11, 1943  2 Sheets-Sheet 2

INVENTOR.
Donald G. Smellie
BY
Harry S. Dumarse
ATTORNEY.

Patented Dec. 12, 1944

2,364,877

UNITED STATES PATENT OFFICE 2,364,877

SUCTION CLEANER

Donald G. Smellie, Canton, Ohio, assignor to The Hoover Company, North Canton, Ohio, a corporation of Ohio Application November 11, 1943, Serial No. 509,876

5 Claims. (Cl. 183—57)

The present invention relates to suction cleaners in general and more particularly to improvements in a suction cleaner providing an initial dirt separator and also a final dirt separator. More specifically the invention comprises improved means in a suction cleaner to remove collected foreign material from a final dirt separator and return it to the initial dirt separator.

It is an object of the present invention to provide a new and improved suction cleaner. It is another object of the invention to provide a new and improved suction cleaner of the type incorporating both initial and final dirt separators. A still further object of the invention is to provide a suction cleaner of the type incorporating initial and final dirt separators and in which foreign material is removed from the final dirt separator by the cooperative action of pressure and suction nozzles. A still further object of the invention is to provide a suction cleaner in which collected foreign material is removed from a dirt separator by the cooperative action of pressure nozzles and suction nozzles acting upon the opposite sides of the included filter. These and other more specific objects will appear upon reading the following specifications and claims, and upon considering in connection therewith the attached drawings to which they relate.

Referring now to the drawings, in which a preferred embodiment of the invention is illustrated:

Figure 1:
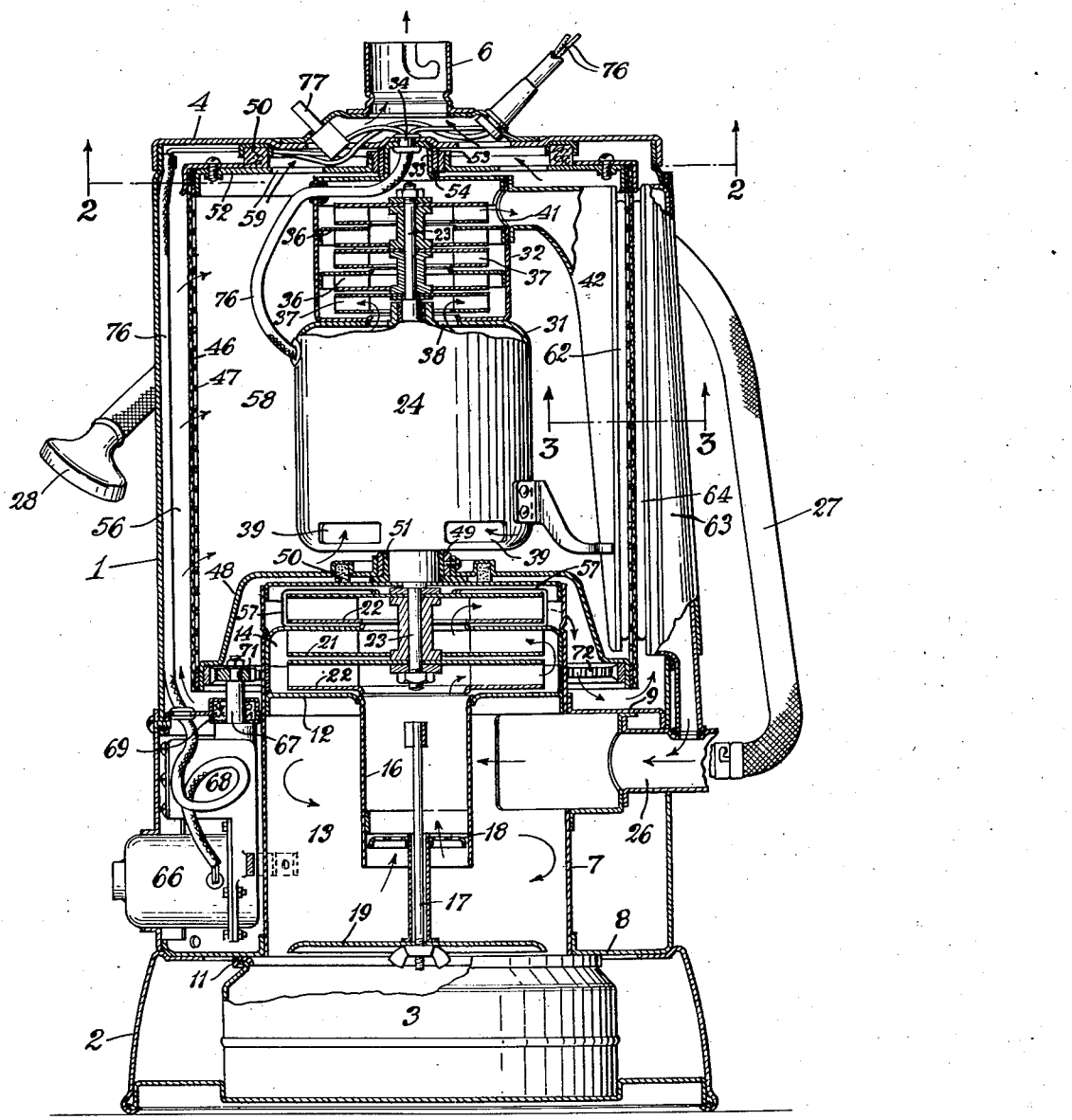
Figure 1 is a vertical section through a suction cleaner constructed in accordance with a preferred embodiment of the present invention.
Figure 2:
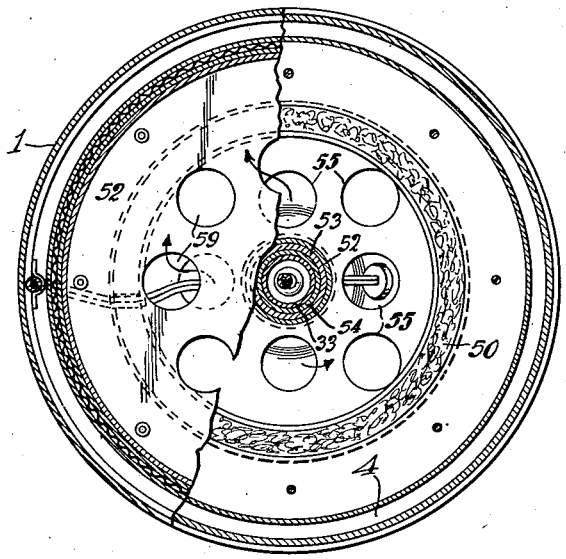
Figure 2 is a horizontal section looking in the direction of the arrows upon line 2—2 of Figure 1.
Figure 3:
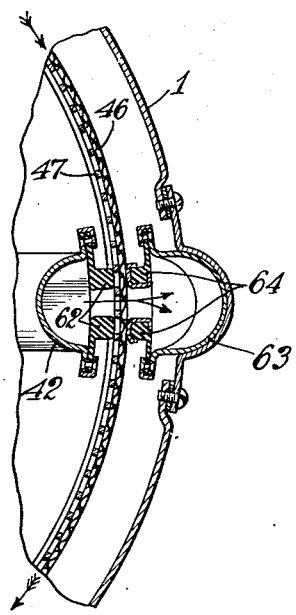
Figure 3 is a partial section upon the line 3—3 of Figure 1 showing the cooperative pressure and suction nozzles in section.

The modern suction cleaner has the inherent disadvantage that collected foreign material must be removed periodically from the machine. In the usual suction cleaner foreign material is collected in a dirt bag which is removed from the machine and agitated to dislodge the adhering material. Unavoidably a part of this material gets into the surrounding air and is objectionable to the user. Certain suction cleaners have made use of mechanical dirt separators in an attempt to eliminate the necessity for the dirt-collecting filter such as the dust bag. These machines have unfortunately been characterized by the continuous escape into the surrounding atmosphere of a small part of the collected material which, being in the form of a fine dust, is noticeable to the user. The patent to Bible 2,247,472 discloses a step forward in the suction cleaner art, a step in which the dirt-removing ability of an initial dirt separator of the mechanical type is supplemented by a final filter which removes from the air stream through the machine all material which escapes from the first separator. To clean this final filter Bible provides a nozzle which is connectible to his source of suction at the initial separator and which is manually operable. The present invention provides an improved filter-cleaning system in a cleaner of the Bible type.

Returning now to the drawings, a cleaner is illustrated and is seen to comprise a cylindrical body 1, positioned upon a supporting base 2 in which is removably positioned a dirt-receiving pan or container 3. The casing 1 is shown with its major axis vertically although it is to be understood that this is not of the essence. Casing 1 is provided with a top or cover 4, which is provided centrally with an exhaust port of the type adapted to receive and seat the cleaner end of a dusting tool unit. Positioned within casing 1, and immediately above the dirt receptacle 3, is a second cylindrical casing 7 which is supported from the casing 1 by means of transverse wall plates 8 and 9. The open top of dirt container 3 is sealed at 11 to the lower transverse plate 8 so that it opens only into the casing 7.

Inner cylindrical casing 7 is divided by an internal transfer wall 12 into a whirl chamber 13 and a fan chamber 14. A downwardly extending inlet 16 from the eye of the fan chamber 14 internally connects the whirl chamber and the fan chamber. Within inlet 16 is a vertically extending rod 17 supporting a filter 18 at the mouth of the inlet 16, and a baffle plate 19 of a diameter slightly less than that of the casing 7 immediately above the dirt container 3.

Fan chamber 14 is divided into a first stage and a second stage by a permanent deflector 21 forward with a multiplicity of vanes in a common and well-known manner, and within each stage is positioned a rotatable fan 22 fixedly mounted upon the depending extremity of the shaft 23 of a motor 24 positioned immediately thereabove. The whirl chamber 13 is provided with a tangentially directed inlet port 26 which extends outwardly through the enclosing casing 1 and is formed in the manner of the exhaust port 6, being adapted to seat the cleaner end of the dusting tool unit including the flexible hose 27 with a cleaning nozzle 28 at the end thereof.

The motor 24 which drives the suction-creating fans 22 is positioned immediately above the fan chamber, and its casing, indicated at 31, is fixedly attached at its upper end to the casing 32 of a second fan chamber unit which is itself suspended from the top plate 4 of the casing 1 by means of a central hub-like cylindrical portion 33 seated and held by a hollow rivet member 34. The fan casing 32 is itself divided into a plurality of individual fan chambers by spaced fixed separators 36 and within each of the chambers, which are of course centrally connected on their intake sides, is positioned a fan 37. These fans are fixedly mounted upon the upper end of the motor shaft 23. The intake of the initial fan chamber is indicated at 38 and is seen to open into the interior of motor casing 31 which is itself provided with inlet ports 39 at its lower end. The exhaust port for the fan unit is at the upper end at 41 and connects directly to a vertically extending blowing nozzle 42.

The whirl chamber 13, through which air is drawn by the suction-creating fan 22, comprises the initial dirt separator. The second or final dirt separator comprises a cylindrical filter 46 of suitable air-permeable filtering material which is carried by the foraminous cylinder 47 positioned between the upper transverse plate 9 and the top of casing 1 and concentrically within the casing 1. A contoured bottom wall 48 carries a central sleeve bearing 49 which seats rotatably upon a bearing 51 fixedly carried by the lower end of motor casing 31 and by the top wall of the fan chamber 14. The upper end of the foraminous cylinder 47 is carried by a top wall 52 which carries a sleeve 53 rotatable upon a bearing 54 on the hub-like portion 33 of the upper fan chamber casing 32. Seals 50 are present between walls 48 and 52 and the adjacent stationary walls of the casing of fan chamber 14 and wall 4 of the casing 1. These seals provide end closures for the filter chamber 56. By these mountings filter 46 is rotatable upon the central axis of the machine and divides the casing above the transverse plate 9 into a final filter chamber 56 on its exterior, which is connected to the exhaust port 57 of the fan unit 14, and a discharge chamber 58 on its interior, which is connected through ports 59 in the wall 52, and 55 in the wall 4, to the exhaust outlet 6. Air exhausted from the fan unit 14 will pass from the exterior of the filter 46 inwardly to the interior thereof, any foreign material collecting upon the exterior surface.

The pressure nozzle 42 connected to the second fan unit 32 is provided with an elongated mouth formed by spaced lips 62 which contact with the interior surface of the foraminous cylinder 47. The nozzle mouth extends substantially the full length of the filter and, in the preferred embodiment shown, the mouth and its supporting surfaces are made of rubber and are so contoured as to ride upon the interior surface of the filter 47 with a slight pressure. Immediately opposite pressure nozzle 42 is a suction nozzle 63 formed with a parallel and directly apposed mouth defined by a pair of spaced lips 64. These lips ride directly in contact with the filter 46, being resiliently urged thereagainst in the manner of the lips 62. Lips 63 are preferably covered by metal faces, as illustrated. The lips 62 are provided with no such faces, the surface of the plate 47 preferably being suitably sand blasted and buffed to remove sharp edges from the apertures. It may also be chromium plated so as to provide an absolutely smooth surface. The nozzle 63 connects at its lower end directly to the intake port 26 of the whirl chamber 13 and at all times the suction present within the whirl chamber is effective to draw air through the filter-cleaning nozzle 63 as well as through any dusting tools attached to the port 26.

As the pressure filter-cleaning nozzle 42 and also the suction filter-cleaning nozzle 63 are fixedly mounted it is clear that they contact only a relatively small area of the final filter 46 at any one time. Accordingly it is necessary that filter 46 be rotated upon the bearings 51 and 54 in order to bring all parts of the filter into contact with the nozzles in order to be cleaned. To accomplish this there is provided a second motor 66 located adjacent the whirl chamber 13 and connected to a vertical shaft 67 through a gear reduction mechanism 68. Shaft 67 passes through a suitable seal 69 at the wall 9 to prevent the passage of air downwardly from the final filter chamber 56. The upper end of shaft 67 is provided with a pinion gear 71 which meshes with a ring gear 72 carried by the rotatable bottom wall 48. Rotation of the motor effects the rotation of the gear and the movement of the filter 46 at slow speed.

To energize motors 24 and 66 current-conducting leads 76 enter through the top wall 4 of the casing 1 and pass to the respective motors, a suitable manual switch 77 being provided which controls the flow of current of both motors.

The operation of a suction cleaner constructed in accordance with the present invention is as follows. The operator connects the dusting tool unit comprising the nozzle 28 and hose 27 to the suction intake port 26. If he wishes to use the machine for blowing purposes the connection would be to the exhaust port 6. The closing of the manually operable electrical switch 77 energizes both motors 24 and 66. The high speed rotation of motor 24 causes the suction-creating fans 22 to cause a reduced pressure within the whirl chamber 13 and air is drawn through the dusting tool unit into the whirl chamber. This air enters the whirl chamber 13 tangentially and foreign material therein is thrown radially outward to drop downwardly past the baffle plate 19 and into the dirt receptacle 3. The cleaned air without this foreign material is drawn upwardly past the filter plate 18, which removes any large foreign material, and into the fan chamber 14 by the action of the fans 22. The air is then exhausted from the fan unit at the exhaust ports 57 and is directed by the overlying rotatable bottom plate 48 of the rotatable cylinder downwardly and to the exterior of the final filter 46. Being under pressure the air passes through this filter to the interior or discharge chamber 58, any foreign material remaining in the air after passing through the initial separator being collected upon the outside of the filter. Most of the air in the chamber 58 passes upwardly through the port 59 in the top wall 52 of the discharge chamber, through the ports 55 in the top wall 4, and makes its escape from the cleaner at the exhaust port 6. A part of the cleaned air in the discharge chamber 58, however, enters the inlet 39 at the lower end of the motor 24 under the suction created by the fans 37. This air passes upwardly through the motor, where it performs a cooling effect, through the second fan chamber 32, and is discharged at the exhaust port 41 thereof into the positive pressure filter-cleaning nozzle 42. Air is discharged along the entire length of the nozzle mouth defined by the lips 62 and passes outwardly through the foraminous cylinder 47 and through the adjacent filter 46. Immediately opposite the nozzle 42 is the suction filter-cleaning nozzle 63 which is provided with the suction of the whirl chamber 3 and air which is exhausted from the positive pressure nozzle 42 enters directly into the suction nozzle 63. Any foreign material in the filter 46 is carried into the nozzle 63 and passes through the intake port 26 and into the whirl chamber 13 where on its second passage therethrough it is removed and deposited in the dirt receptacle 3. Receptacle 3 is removed from time to time manually, the dirt sliding readily therefrom without the shaking operation which is necessary in the case of a dust bag.

I claim:

1. In a suction cleaner of the type having an initial dirt separator, suction-creating means to draw air through said initial separator, and a final dirt separator to receive air from said suction-creating means and to remove therefrom any foreign material therein which has passed through said initial separator; pressure-creating means to increase the pressure on air from said final separator, an air-directing element to direct air from said pressure-creating means through said final separator in the reverse direction to displace collected foreign material therefrom, and air-conducting means to conduct said air from said pressure-creating means to said initial separator.

2. In a suction cleaner of the type having an initial dirt separator, suction-creating means to draw air through said initial separator, and a final dirt separator including a filter element to receive air from said suction-creating means and to remove therefrom any foreign material therein which has passed through said initial separator; pressure-creating means to increase the pressure on air from said final separator, a nozzle connected to said pressure-creating means to direct air under pressure from the low pressure side to the high pressure side of said filter element, a second nozzle upon the opposite side of said filter element connected to said initial separator to convey foreign material from said filter element to said initial separator.

3. In a suction cleaner of the type having an initial dirt separator, suction-creating means to draw air through said initial separator, and a final dirt separator including a filter element to receive air from said suction-creating means and to remove therefrom any foreign material therein which has passed through said initial separator; pressure-creating means connected to clean air to increase the pressure thereon, a nozzle connected to said pressure-creating means to direct air under pressure from the clean side to the dirty side of said filter element, a second nozzle upon the opposite side of said filter connected to said initial separator to convey displaced foreign material thereto, said nozzles being apposed, and means to effect relative movement between said nozzles and said filter to enable said nozzles to clean the entire filter area.

4. In a suction cleaner of the type having an initial dirt separator, suction-creating means to draw air through said initial separator, and a final dirt separator including a rotatable cylindrical filter to receive air from said suction-creating means and to remove therefrom any foreign material therein which has passed through said initial separator; pressure-creating means connected to a source of clean air to increase the pressure thereon, a nozzle connected to said pressure-creating means to direct air under pressure through the wall of said cylindrical filter from the clean side thereof, a second nozzle upon the dirt-collecting side of said filter connected to said initial separator to convey dislodged foreign material thereto, said nozzles being apposed, and means to rotate said cylindrical filter past said nozzles.

5. In a suction cleaner, a pair of suction-creating means, a driving motor for said suction-creating means, an initial dirt separator connected to the intake of one of said suction-creating means to conduct air thereto, a final dirt separator including a movable filter connected to the same suction-creating means to receive air therefrom, air-conducting means to direct air under pressure from the pressure side of the second suction-creating means through said filter from the clean side thereof, air-conducting means apposed to said first-mentioned air-conducting means and connected to said initial separator to convey dislodged foreign material from said filter to said initial separator, and driving means to move said filter relative to said air-conducting means.

DONALD G. SMELLIE.